US009043334B2

(12) United States Patent
Chiueh et al.

(10) Patent No.: US 9,043,334 B2
(45) Date of Patent: May 26, 2015

(54) METHOD AND SYSTEM FOR ACCESSING FILES ON A STORAGE SYSTEM

(71) Applicant: Industrial Technology Research Institute, Hsinchu (TW)

(72) Inventors: Tzi-Cker Chiueh, Taipei (TW); Dileep Ramesh, Bangalore (IN); Akshay Khole, Maharashtra (IN); Ping-Hung Lin, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 192 days.

(21) Appl. No.: 13/726,628

(22) Filed: Dec. 26, 2012

(65) Prior Publication Data

US 2014/0181119 A1 Jun. 26, 2014

(51) Int. Cl.
*G06F 7/00* (2006.01)
*G06F 17/30* (2006.01)
*G06F 21/64* (2013.01)

(52) U.S. Cl.
CPC .......... *G06F 17/30097* (2013.01); *G06F 21/64* (2013.01)

(58) Field of Classification Search
None
See application file for complete search history.

(56) References Cited

U.S. PATENT DOCUMENTS

| 6,212,525 | B1 | 4/2001 | Guha |
| 6,915,302 | B1 * | 7/2005 | Christofferson et al. ............. 1/1 |
| 7,127,465 | B2 | 10/2006 | Rao et al. |
| 7,131,050 | B2 | 10/2006 | Holt |
| 7,822,728 | B1 | 10/2010 | Chandler et al. |
| 7,844,646 | B1 | 11/2010 | Deshmukh et al. |
| 7,849,106 | B1 | 12/2010 | Agrawal et al. |
| 8,069,317 | B2 | 11/2011 | Boyd et al. |
| 8,190,832 | B2 | 5/2012 | Dickey et al. |
| 8,938,469 | B1 * | 1/2015 | Keen et al. .................. 707/769 |
| 8,972,354 | B1 * | 3/2015 | Telang .......................... 707/654 |

(Continued)

FOREIGN PATENT DOCUMENTS

| CN | 101763416 | 6/2010 |
| CN | 101882147 | 11/2010 |

(Continued)

OTHER PUBLICATIONS

Leung et al., "Spyglass: Fast, Scalable Metadata Search for Large-Scale Storage Systems," 7th USENIX Conference on File and Storage Technologies, Feb. 24-27, 2009, pp. 153-166.

(Continued)

*Primary Examiner* — Neveen Abel Jalil
*Assistant Examiner* — Karina Levitian
(74) *Attorney, Agent, or Firm* — Jianq Chyun IP Office

(57) ABSTRACT

A method for accessing files on a storage system is provided. A hash memory table including a plurality of hash buckets respectively corresponding to a plurality of index hash codes is built. Each of the hash buckets has a pointer pointing towards at least one entry. Each of the entries has a physical address field and a hash code field. The physical address fields respectively record physical addresses storing the files, and the hash code fields respectively record verification hash codes corresponding to the files. The index hash codes are generated by inputting keys of the files to an index hash function and the verification hash codes are generated by inputting keys of the files to a verification hash function. Then, the hash memory table is loaded into the buffer with a bucket-based replacement policy so that the files are able to be accessed according to the hash memory table.

14 Claims, 8 Drawing Sheets

(56) References Cited

U.S. PATENT DOCUMENTS

| | | | |
|---|---|---|---|
| 2003/0204698 A1 | 10/2003 | Sachedina et al. | |
| 2010/0332846 A1* | 12/2010 | Bowden et al. | 713/189 |
| 2011/0218983 A1 | 9/2011 | Chaney et al. | |
| 2012/0191673 A1* | 7/2012 | Chatley et al. | 707/692 |
| 2013/0227195 A1* | 8/2013 | Beaverson et al. | 711/103 |

FOREIGN PATENT DOCUMENTS

| | | |
|---|---|---|
| CN | 102411634 | 4/2012 |
| TW | 200723046 | 6/2007 |

OTHER PUBLICATIONS

Xing et al., "Adaptive and Scalable Metadata Management to Support a Trillion Files," Proceedings of the Conference on High Performance Computing Networking, Storage and Analysis (SC09), Nov. 14-20, 2009, Article No. 26 pp. 1-11.

Stender et al., "BabuDB: Fast and Efficient File System Metadata Storage," 2010 International Workshop on Storage Network Architecture and Parallel I/Os (SNAPI), May 3-3, 2010, pp. 51-58.

Van Heuven Van Staereling et al., "Efficient, Modular Metadata Management with Loris," 2011 Sixth IEEE International Conference on Networking, Architecture, and Storage (NAS 2011), Jul. 28-30, 2011, pp. 278-287.

Simha et al., "An Update-Aware Storage System for Low-Locality Update-Intensive Workloads," Proceedings of the seventeenth international conference on Architectural Support for Programming Languages and Operating Systems (ASPLOS '12), Mar. 3-7, 2012, pp. 375-386.

"Notice of Allowance of Taiwan Counterpart Application", issued on Dec. 27, 2014, p. 1-p. 4.

* cited by examiner

METHOD AND SYSTEM FOR ACCESSING FILES ON A STORAGE SYSTEM

TECHNICAL FIELD

The technical field relates to a method and a system for accessing files on a storage system.

BACKGROUND

Metadata, literally referred to as "data about data," has been widely used in organizing information. The creation and management of metadata has primarily been the responsibility of information professionals engaged in cataloguing, classification, and indexing. As information has become increasingly computerized and digitalized, metadata has involved in the management and interoperability of data management systems and administrative functions. For example, metadata of a file specifies a collection of attributes that describe the file such as the size in bytes, the path, the last modified time, the owner, the accessibility and so on.

Nowadays many network services such as a cloud storage service require a database system to manage and maintain metadata when various operations are performed on a file. The operations with intensive low spatial and temporal locality requests such as reading, writing, deleting, or relocating files on a cloud system limit the disk scheduling flexibility and results in inefficient use of a buffer memory since most database systems are not optimized in randomness of operations. As the number of metadata increases, the input/output (I/O) speed accordingly decreases and the overall performance is significantly limited thereby. Conventional metadata accessing methods are seriously challenged when facing input workloads that are update-intensive with low access locality. Therefore, to boost the performance of workloads on a cloud storage system or other network services dominated by low locality is to optimizedly reduce disk I/O operations.

SUMMARY

The disclosure embodiment provides a method for accessing files on a storage system having a buffer and a disk. The method includes building a hash memory table having a plurality of hash buckets respectively corresponding to a plurality of index hash codes. Each of the hash buckets has a pointer pointing towards at least one entry. Each of the entries has a physical address field and a hash code field. The physical address fields respectively record physical addresses storing the files, and the hash code fields respectively record verification hash codes corresponding to the files. The index hash codes are generated by inputting keys of the files to an index hash function and the verification hash codes are generated by inputting the keys of the files to a verification hash function. The method also includes loading the hash memory table into the buffer with a bucket-based replacement policy and accessing the files according to the hash memory table loaded into the buffer.

The disclosure embodiment provides another method for accessing files on a storage system having a buffer and a disk. The method includes building a hash memory table for recording metadata of the files; embedding logical file names of the files into the physical address storing the files in the disk while the files are written into the disk, loading the hash memory table into the buffer with a bucket-based replacement policy, and accessing the files according to the hash memory table loaded into the buffer and the logical file names embedded into the physical addresses of the disk.

The disclosure embodiment provides a storage system including a microprocessor, a buffer, a disk and a metadata management unit. The buffer and the disk are coupled to the microprocessor respectively. The metadata management unit is coupled to the microprocessor and configured to build a hash memory table including a plurality of hash buckets respectively corresponding to a plurality of index hash codes. Each of the hash buckets has a pointer pointing towards at least one entry. Each of the entries has a physical address field and a hash code field. The physical address fields respectively record physical address storing the files, and the hash code files respectively record verification hash codes corresponding to the files. The index hash codes are generated by inputting keys of the files to an index hash function and the verification hash codes are generated by inputting the keys of the files to a verification hash function. The metadata management unit is further configured to load the hash memory table into the buffer with a bucket-based replacement policy and access the files according to the hash memory table loaded into the buffer.

The disclosure embodiment provides another storage system including a microprocessor, a buffer, a disk and a metadata management unit. The buffer and the disk are coupled to the microprocessor respectively. The metadata management unit is coupled to the microprocessor and configured to build a hash memory table for recording metadata of the files. The metadata management unit is further configured to embed logical file names of the files into the physical address storing the files in the disk while the files are written into the disk. The metadata management unit is further configured to load the hash memory table into the buffer with a bucket-based replacement policy and access the files according to the hash memory table loaded into the buffer and the logical file names embedded into of the physical addresses of the disk.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
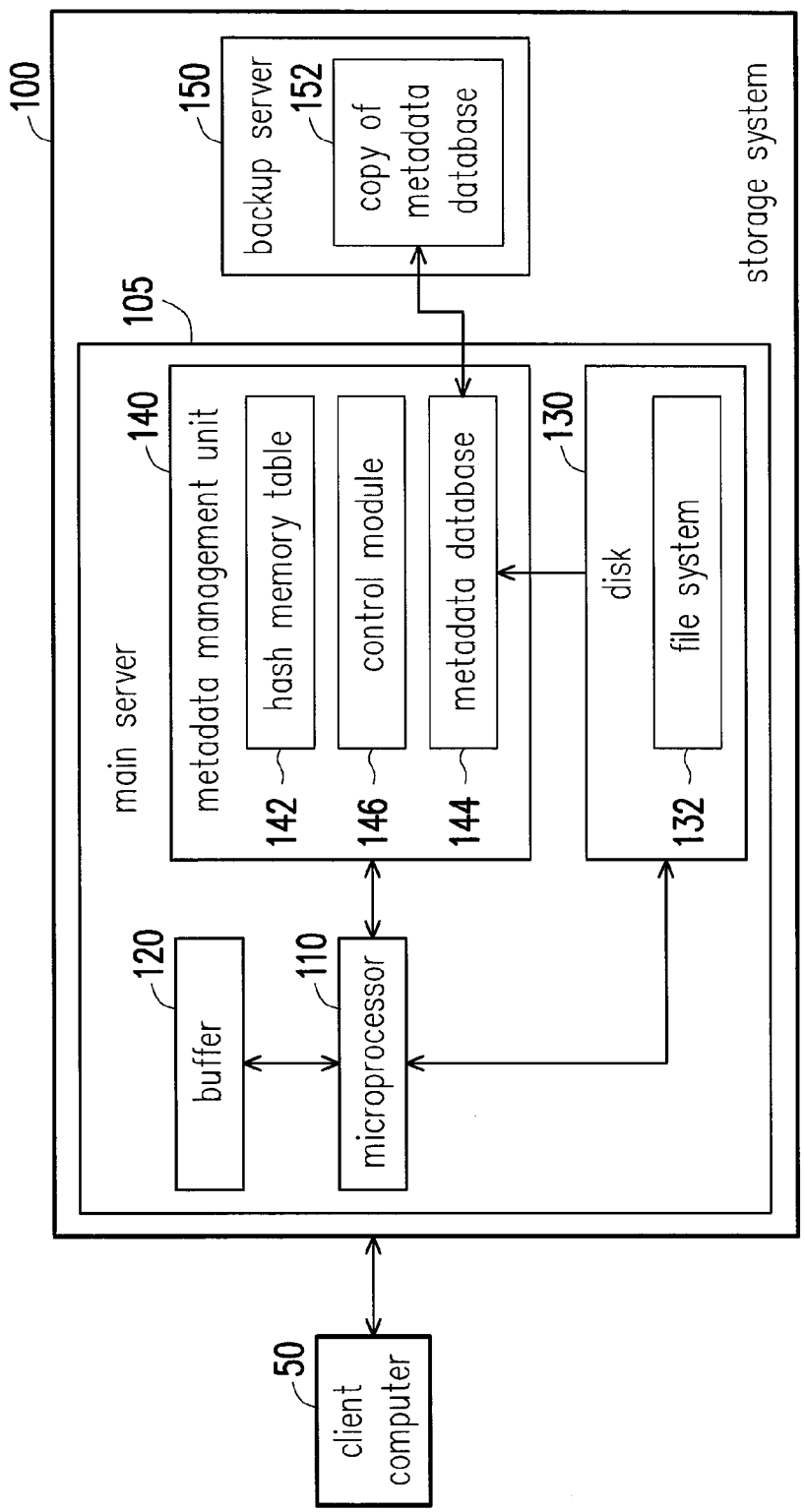
FIG. 1 is a block diagram of a storage system according to an exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

FIG. 1 is a block diagram of a storage system according to an exemplary embodiment of the disclosure.

Referring to FIG. 1, the storage system 100 includes a main server 105 and a backup server 150. The storage system 100 may be implemented as a portion of a Cloud system, and yet the disclosure is not limited thereto. A client may enter commands into the client computer 50 through input devices such as a keyboard or a pointing device such as a mouse, a trackball, or a touch pad, thereby storing files into the storage system 100 or reading files from the storage system 100.

The main server 105 includes a microprocessor 110, a buffer 120, a disk 130, and a metadata management unit 140. The buffer 120, the disk 130, and the metadata management unit 140 are respectively coupled to the microprocessor 110, and the backup server 150 is coupled to the metadata management unit 140.

The microprocessor 110 may be a dedicated or specialized microprocessor configured to perform particular tasks by executing machine-readable software code languages that define functions related to operations to carry out the functional operations such as file reading, file writing, file deletion, file relocation, or metadata database recovery by communicating with other components of the storage system 100.

The buffer 120 is configured to temporarily store data that is frequently stored and retrieved. The buffer 120 may be a faster memory such as random access memory (RAM), a static random access memory (SRAM), or a dynamic random access memory (DRAM) to store temporary data for much faster access time.

The disk 130 is configured for storing and retrieving files. For example, the disk 130 may be a hard disk drive (HDD) or a solid state drive (SSD). The disk 130 includes a file system 132, which is an abstraction to store and organize computer files and the data they contain and is also designed to organize multiple files as a single stream of bytes, an array, a linked list, or other data structures.

The metadata management unit 140 is configured to record all metadata of the files stored in the disk 130 in the buffer 120 and access the files according to the recorded metadata. For example, the metadata management unit 140 includes a hash memory table 142, a metadata database 144 and a control module 146. In the exemplary embodiment, the control module 146 is composed of a plurality of modules and configured to build or maintain the hash memory table 142 for recording metadata of the files and further load the hash memory table 142 into the buffer 120 as well as to store information recorded in the hash memory table 142 into the metadata database 144. In another exemplary embodiment, the metadata management unit 140 (or the control module 146) is further configured to backup a copy of the metadata database 152 into the backup server 150.

Hashing techniques are widely used in computer hardware and software systems. It is adapted to allow the dynamic growth and shrinking of large number of elements such as metadata, thus only little restriction is imposed on the number of the stored elements. For example, the size of metadata corresponding to one file may be up to 256 bytes, wherein metadata may contain a user name, a complete path and a file name of the file. If there exists one billion files on the storage system 100, all metadata may take up to 256 GB of storage space and further cause memory insufficiency. Hashing involves calculating a hash code from a key and using the hash code to look for matches in a table. The function that calculates the hash code is known as a hash function and is well suited for accelerating table lookup or data comparison tasks in metadata storage and retrieval and hence accelerating tasks in file storage and retrieval. The efficiency of a hash memory table implementation is largely dependent on the hash function used.

Figure 2:
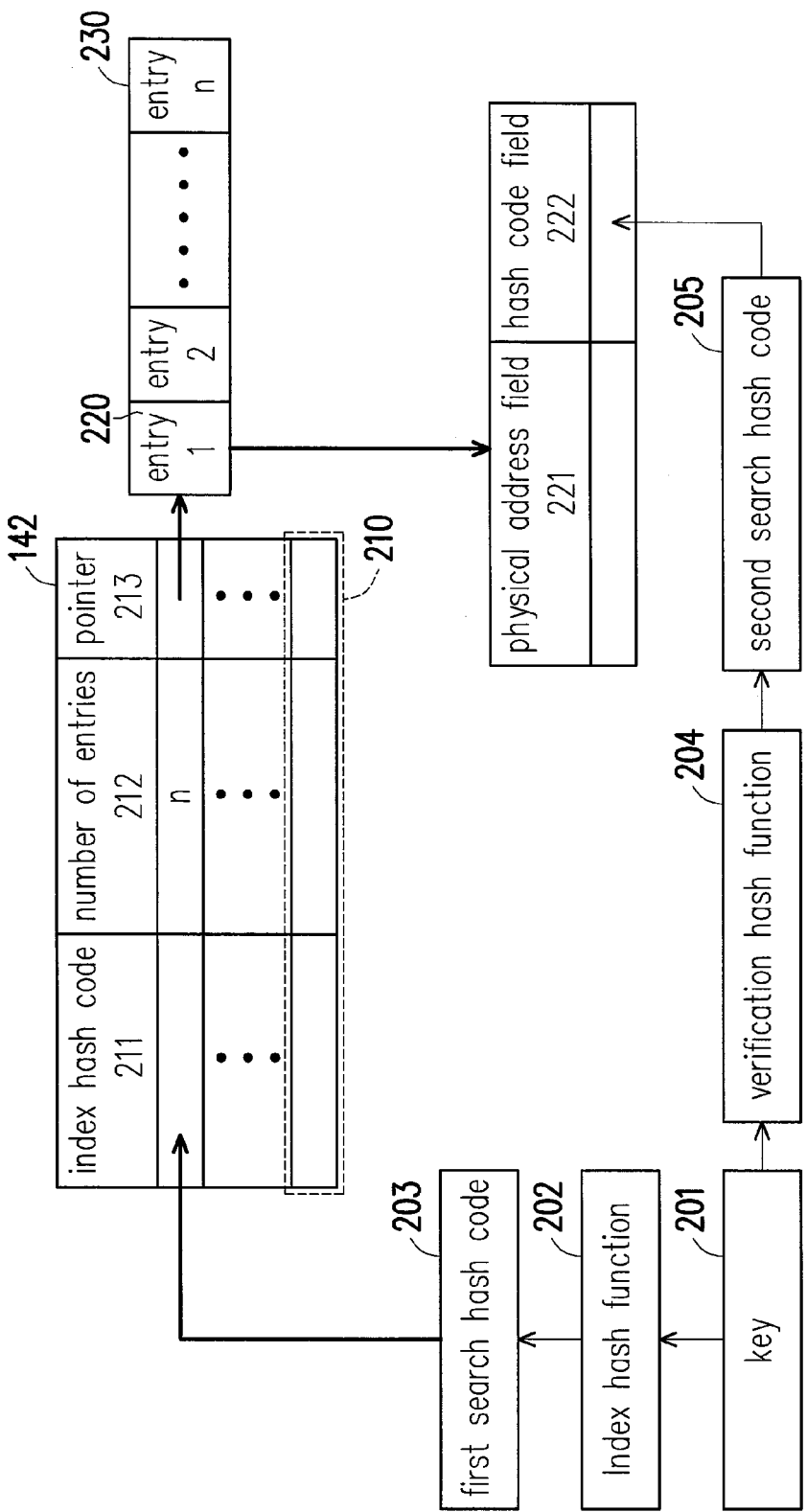
FIG. 2 is a schematic block diagram of the hash memory table in FIG. 1 according to an exemplary embodiment of the present disclosure.

FIG. 2 is a schematic block diagram of the hash memory table 142 in FIG. 1 according to an exemplary embodiment of the present disclosure.

Referring to FIG. 2, the hash memory table 142 includes a plurality of hash buckets 210. Each of the hash buckets 210 includes a plurality of pieces of information composed of an index hash code 211, the number of entries 212, and a pointer 213.

The index hash code 211 is the information for identifying files in the disk 130 for managing files and takes up to 4 bytes. Each of the pointer 213 points towards at least one entry 220, wherein the entries 220 referenced by the same pointer form an array 230 and each of the pointer 213 takes up to 8 bytes. The number of entries 212 refers to the number of the entries 220 within the corresponding array 230.

Each of the entries 220 includes a physical address field 221 and a hash code field 222. Each of the physical address fields 221 respectively records physical addresses of the files. The physical addresses in the physical address fields 221 may be an inode number, which includes a pointer to the blocks in which the files are stored. The physical addresses may also be the block number represented in a form of binary numbers or hex numbers. Each of the physical address fields 221 takes up to 6 bytes. Each of the hash code fields 222 respectively records verification hash codes corresponding to the files and takes up to 4 bytes. Further, each of the entries may also include other information such as latest modified date, version, access right, directory flag, and the like.

Each of the index hash codes 211 and the verification hash codes in the hash code field 222 is calculated by applying hash functions. In the present exemplary embodiment, each of the index hash codes 211 and each of the verification hash codes in the hash code field 222 are generated by inputting keys 201, which are corresponding files to be stored into the disk 130, into an index hash function 202 and a verification hash function 204 respectively. For example, each key may contain a text string of a logical file name corresponding to a file. When it comes to file accessing operations, the index hash function 202 and the verification hash function 204 are also applied to the key 201 corresponding to a file to be accessed so as to generate a first search hash code 203 and a second search hash code 205 respectively. The first search hash code 203 and the second search hash code 205 are then compared with the index hash codes 211 and the verification hash codes recorded in the hash code field 222 respectively for file identification.

Further, the index hash function 202 and the verification hash function 204 are different hash functions, which may reduce the probability of collision in producing hash codes. A hash collision occurs when a system implementing content-addressable storage contains two files with different content yet having the same hash code. The principle of a hash memory table is that a possibly infinite set of elements is partitioned into a finite number of hash codes. The dependence of hash codes of different keys is preferably non-obvious. With a good hash function, all the bits in a key affect the generated hash codes. Therefore, the index hash function 202 may be, for example, the Murmur3 hash function, which is able to produce 32-bit hash values efficiently and achieve better distribution with minimum repetition frequency. The verification hash function 204 may be, for example, the FNV1A hash function, which comes in 32-, 64-, 128-, 256-, 512-, and 1024-bit flavors and is easy to be implemented. It may be noted that when the number of the entire buckets is one billion, the probability of occurring more than four collisions is less than 0.30%. Though the probability is relatively low compared to the size of the entire buckets, an exemplary embodiment will be explained later on in an attempt to solve this problem.

Furthermore, it is also noted that when an additional entry is inserted into the hash memory table, it may result in complete memory exhaustion. The buffer may employ a bucket-based replacement policy to select at least one of the least accessed buckets for eviction until the memory of the buffer is sufficient for the additional entry. The replacement policy is bucket-based and may not be entry-based to guarantee correctness for comparing the second search hash code. Such process may also be done when the memory usage is greater than, for example, 90%.

Figure 3:
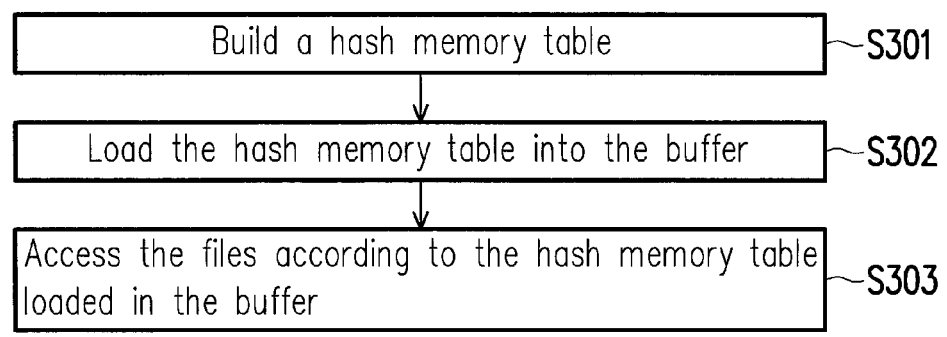
FIG. 3 is a flowchart illustrating a method for accessing a file in a disk according to an exemplary embodiment of the present disclosure.

FIG. 3 is a flowchart illustrating a method for accessing a file in a disk according to an exemplary embodiment of the present disclosure.

Referring to FIG. 3 along with the components of FIG. 1 and FIG. 2, in the present exemplary embodiment, the metadata management unit 140 (or the control module 146) builds the hash memory table 142 (Step S301). Then, the metadata management unit 140 (or the control module 146) loads the hash memory table 142 into the buffer 120 (Step S302). And, the metadata management unit 140 (or the control module 146) accesses a requested file according to the hash memory table 142 loaded in the buffer 120 (Step S303). To be specific, when a file writing request, a file update request, a file deleting request, or a file relocating request is accepted, the metadata management unit 140 (or the control module 146) maintains the hash memory table 142 loaded into the buffer 120 with the bucket-based replacement policy such that files stored in the disk 130 can be accessed with less disk I/O operations.

Figure 4:
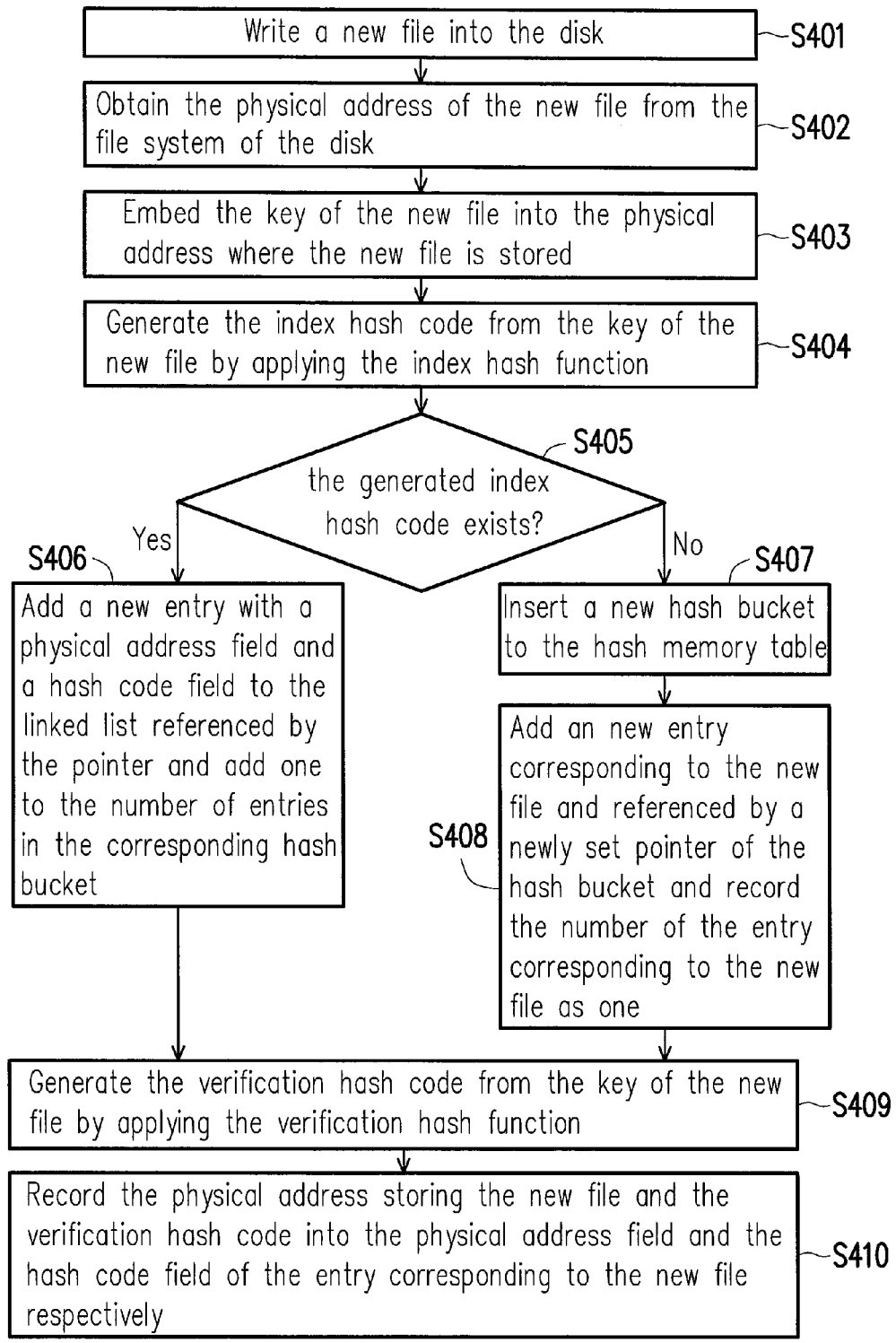
FIG. 4 is a flowchart illustrating a method for updating the hash memory table when a new file is written into the disk according to an exemplary embodiment of the present disclosure.

FIG. 4 is a flowchart illustrating a method for updating a hash memory table when a new file is written into a disk according to an exemplary embodiment of the present disclosure.

Referring to FIG. 4 along with the components of FIG. 1 and FIG. 2, in this exemplary embodiment, a new file is written into the disk 130 from the client computer 50 (Step S401). As mentioned previously, when the number of the entire buckets is one billion, the probability of occurring more than four collisions is less than 0.30%. To solve this problem, in an exemplary embodiment, when the client computer 50 writes or uploads a file, the key (ie. the logical address) of the new file is written in the first sector of the physical address so that if there are more than one file is identified after the hash code matching process, the first sector may confirm if the searched file is indeed the matched file. Therefore, the physical address of the new file may require to be obtained from the file system 132 of the disk 130 (Step S402). The key 201 of the new file may be embedded into the physical address at which the new file is stored (Step S403). Next, the index hash function 202 is applied to the key 201 of the new file so as to generate the index hash code 211 corresponding to the new file (Step S404). Then, it is determined whether the new generated index hash code 211 corresponding to the new file already exists in the hash memory table 142 (Step S405).

If the new generated index hash code 211 corresponding to the new file already exists in the hash memory table 142, a new entry 220 with a physical address field 221 and a hash code field 222 is added to the array 230 referenced by the pointer 213 and the number of entries 212 in the corresponding hash bucket 210 is added by one (Step S406). If the new generated index hash code 211 corresponding to the new file does not exist in the hash memory table 142, a new hash bucket 210 is inserted to the hash memory table 142 (Step S407). An entry 220 corresponding to the new file is added and referenced by a newly set pointer 213 of the hash bucket 210 while the number of the entries 212 corresponding to the new file is recorded as one (Step S408). The verification hash function 204 is applied to the key 201 of the new file so as to generate the verification hash code corresponding to the new file (Step S409). The physical address storing the new file and the verification hash code corresponding to the new file is recorded into the physical address field 221 and the hash code field 222 of the entry 220 corresponding to the new file respectively (Step S410) and the hash memory table 142 update is completed.

Figure 5:
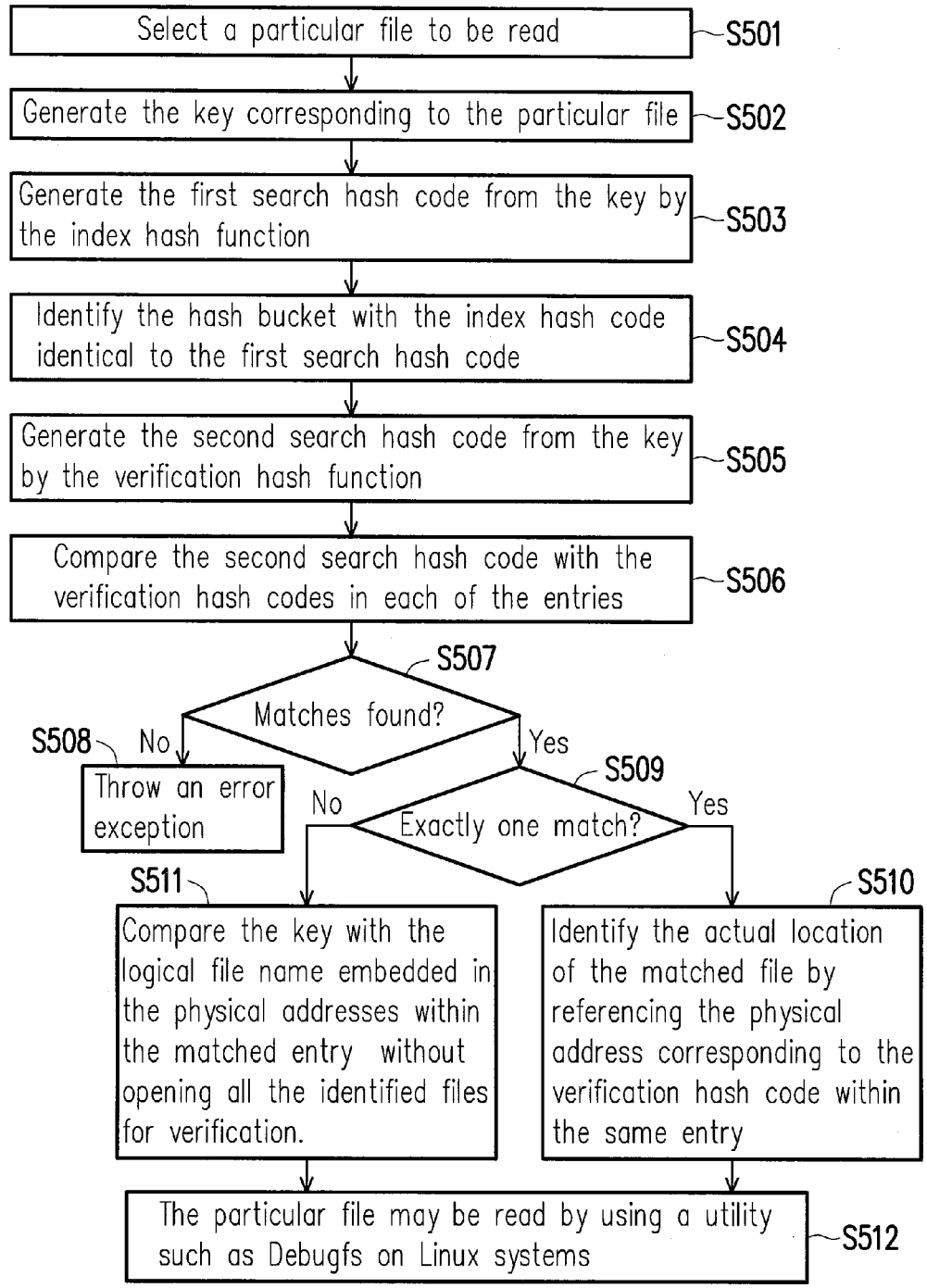
FIG. 5 is a flowchart illustrating a method for updating the hash memory table when a file read request is executed according to an exemplary embodiment of the present disclosure.

FIG. 5 is a flowchart illustrating a method for updating a hash memory table when a file read request is executed according to an exemplary embodiment of the present disclosure.

Referring to FIG. 5 along with the components of FIG. 1 and FIG. 2, in this exemplary embodiment, when a particular file to be read is selected by the client computer 50 (Step S501), the key 201 corresponding to the particular file is generated (Step S502). The index hash function 202 is applied to the key 201 corresponding to the particular file so as to generate the first search hash code 203 corresponding to the particular file (Step S503). The first search hash code 203 corresponding to the particular file is compared with the index hash codes 211 in each of the hash buckets 210. The hash bucket 210 with the index hash code 211 identical to the first search hash code 203 corresponding to the particular file is identified (Step S504). The identified hash bucket 210 also contains the pointer 213 pointing to the array 230. Next, the verification hash function 204 is applied to the key 201 corresponding to the particular file so as to generate the second search hash code 205 corresponding to the particular file (Step S505). The second search hash code 205 is then compared with the verification hash code in the hash code field 222 of each of the entries 220 within the array 230 referenced by the pointer 213 in an iterative fashion beginning from the first entry (Step S506). Then, it is determined whether at least one match is found (Step S507). If no match is found, an error exception is thrown to the client computer 50 (Step S508). If at least one match is found, it is determined whether exactly one match is found (Step S509). If exactly one match is found, the actual location of the matched file is immediately identified by referencing the physical address in the physical address field 221 corresponding to the verification hash code within the same entry 220 (Step S510). If more matches are found, the key 201 is compared with the logical file name embedded in the physical addresses within the matched entry 220 without opening all the identified files for verification (Step S511). Lastly, the file may be read by using a utility such as Debugfs on Linux systems (S512).

Figure 6:
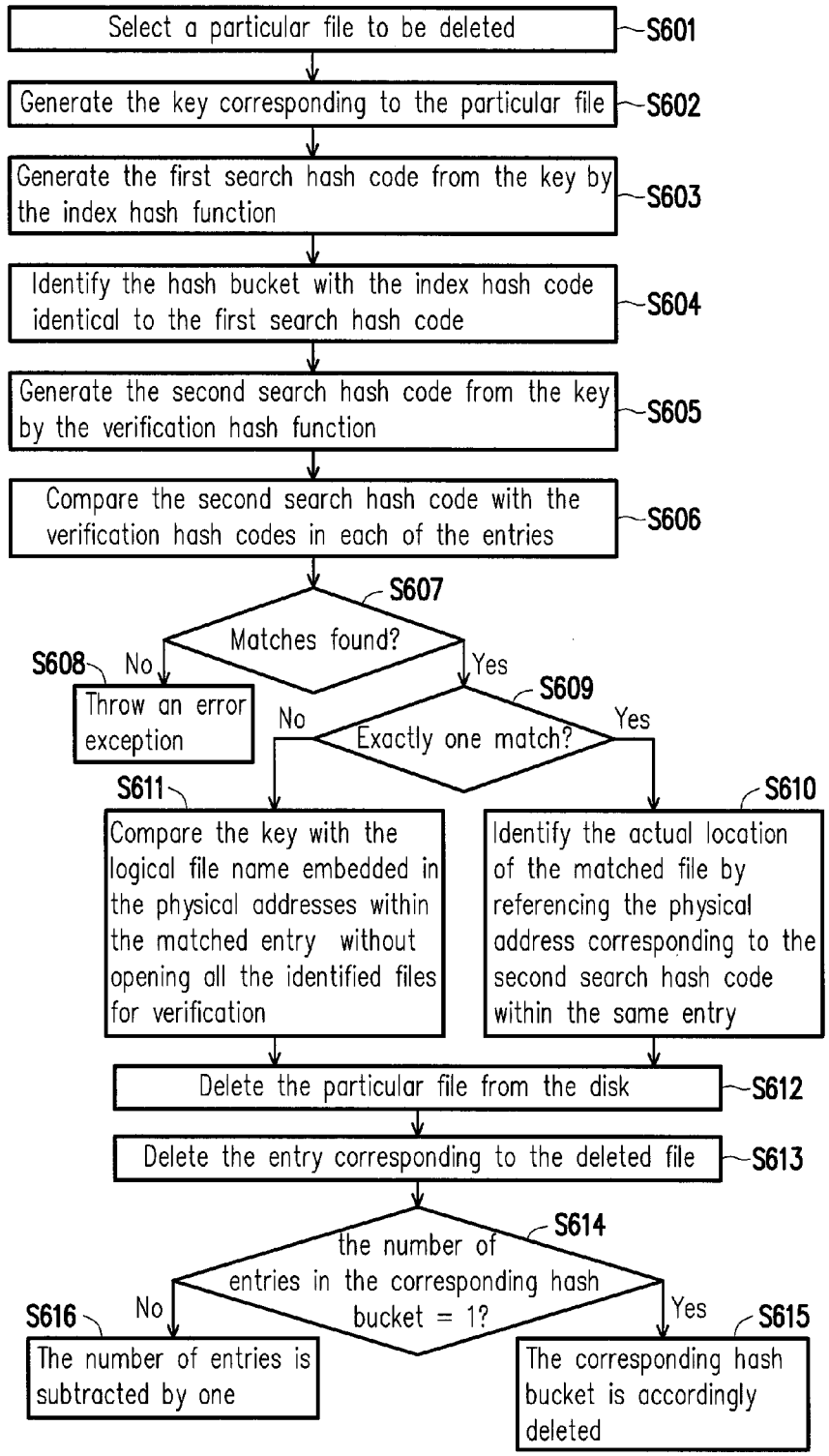
FIG. 6 is a flowchart illustrating a method for updating the hash memory table when a file is deleted from the disk according to an exemplary embodiment of the present disclosure.

FIG. 6 is a flowchart illustrating a method for updating a hash memory table when a file is deleted from a disk according to an exemplary embodiment of the present disclosure.

Referring to FIG. 6, in the present exemplary embodiment, when a particular file to be deleted is selected by the client computer 50 (Step S601), the key 201 corresponding to the particular file is generated (Step S602). Next, the entry 220 corresponding to the particular file is identified in Step S603 to Step S611, wherein Steps S603-S611 correspond to Steps S503-S511 in FIG. 5 and will not be explained in details hereinafter. After the entry 220 corresponding to the particular file is identified, the particular file is deleted from the disk 130 (Step S612). The entry 220 corresponding to the particular file is deleted (Step S613). Then, it is determined whether the number of entries 212 in the corresponding hash bucket 210 is one (Step S614). If the number of entries 212 in the corresponding hash bucket 210 is one, then the hash bucket 210 is accordingly deleted (Step S615). If the number of entries 212 in the corresponding hash bucket 210 is greater than one, then the number of entries 212 is subtracted by one (Step S616), and the hash memory table 142 update is completed.

Figure 7:
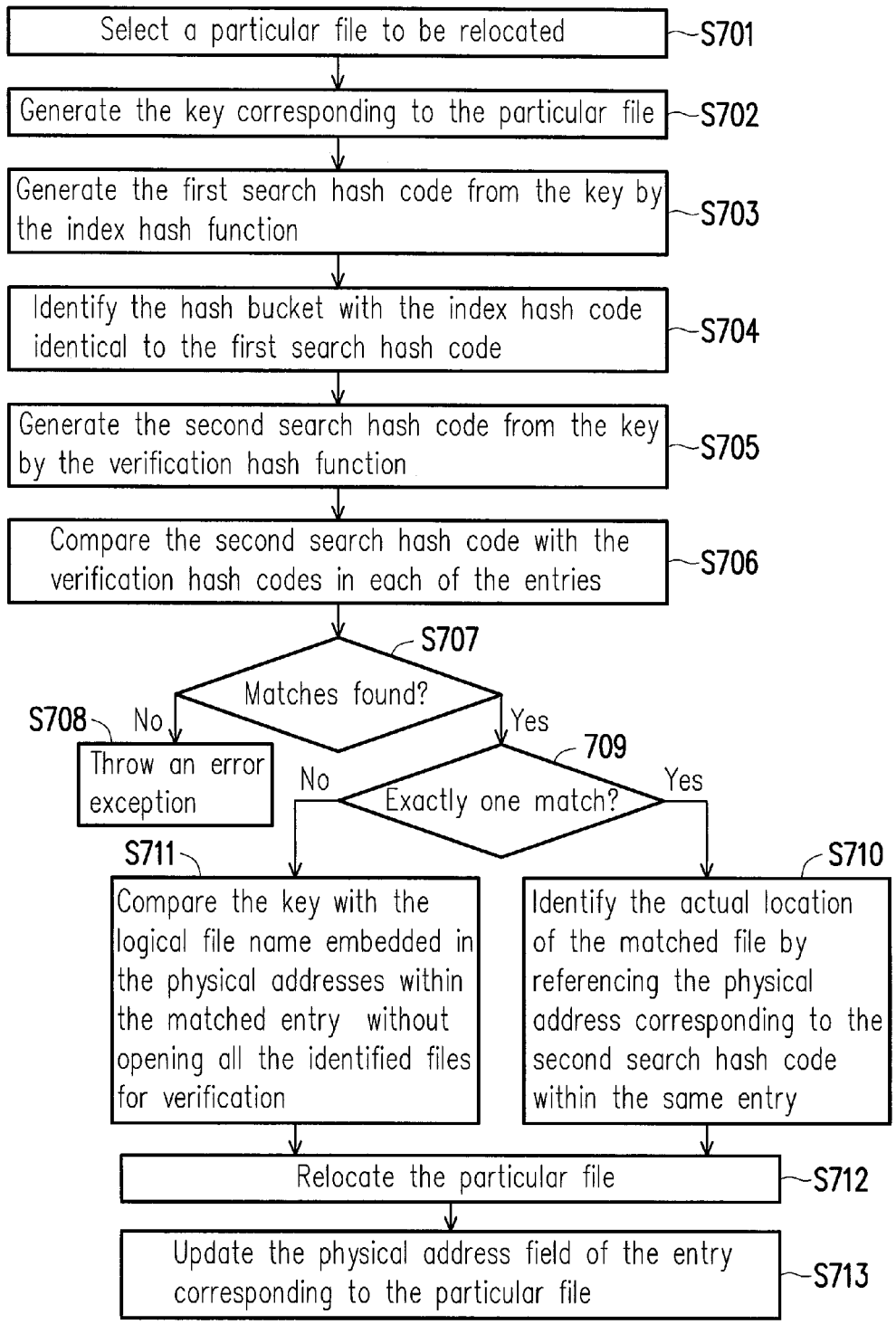
FIG. 7 is a flowchart illustrating a method for updating the hash memory table when a file is moved to another physical address according to an exemplary embodiment of the present disclosure.

FIG. 7 is a flowchart illustrating a method for updating the hash memory table when a file is relocated to another physical address according to an exemplary embodiment of the present disclosure.

Referring to FIG. 7 along with the components of FIG. 1 and FIG. 2, in this exemplary embodiment, when a particular file to be relocated is selected by the client computer 50 (Step S701), the key 201 corresponding to the particular file is generated (Step S702). Next, the entry 220 corresponding to the particular file is identified in Step S703 to Step S711), wherein Steps S703-S711 correspond to Steps S503-S511 in FIG. 5 and will not be explained in details hereinafter. After the entry 220 corresponding to the particular file is identified, the particular file is relocated from the physical address 221 to another physical address 221 (Step S712). Then the another physical address is updated in the physical address field 221 of the entry 220 corresponding to the particular file (Step S713) and the hash memory table 142 update is completed. It is remarked that to ensure the hash memory table 142 works properly, the file system 132 may be defragmented periodically so that the files are stored in a contiguous manner. Defragmentation involves moving various blocks to new locations. While certain blocks are moved for defragmentation purposes particularly for cleaning free space and optimizing durability, the metadata management unit 140 (or the control module 146) needs to be notified with any changes of the physical addresses.

Referring to FIG. 1 again, it is noted that the hash memory table 142 containing metadata is stored in the metadata database 144. The metadata database 144 is updated synchronously with the hash memory table 142 loaded in the buffer 120 as well as the file system 132 of the disk 130. In an exemplary embodiment, the copy of the metadata database 152 is created in the backup server 150. In the copy of the metadata database 152, the metadata found in the hash memory table 142 are backed up and are used for recovery process. This process may also take continuous copies of modifications and store them locally in a temporary directory. The copies of changed data may also be taken at predefined time intervals. When the backup server 150 is attached, all those temporary data not existing on the backup server 150 may be transferred. When restoring the metadata database 144, it may be restored to a content that existed at a specific time, or that has existed over a time period, such that the metadata database 144 can be restored to its latest version. Normally when the main server 105 is shutdown, it is left in a consistent state. That is, all contents within the metadata database 144 and the contents of all the file system 132 are synchronized. After a crash has occurred, it is possible for the storage system 100 to be left in an inconsistent state. There may exist inconsistencies between the file system 132 and the contents of the metadata database 144 in the main server 105.

Figure 8:
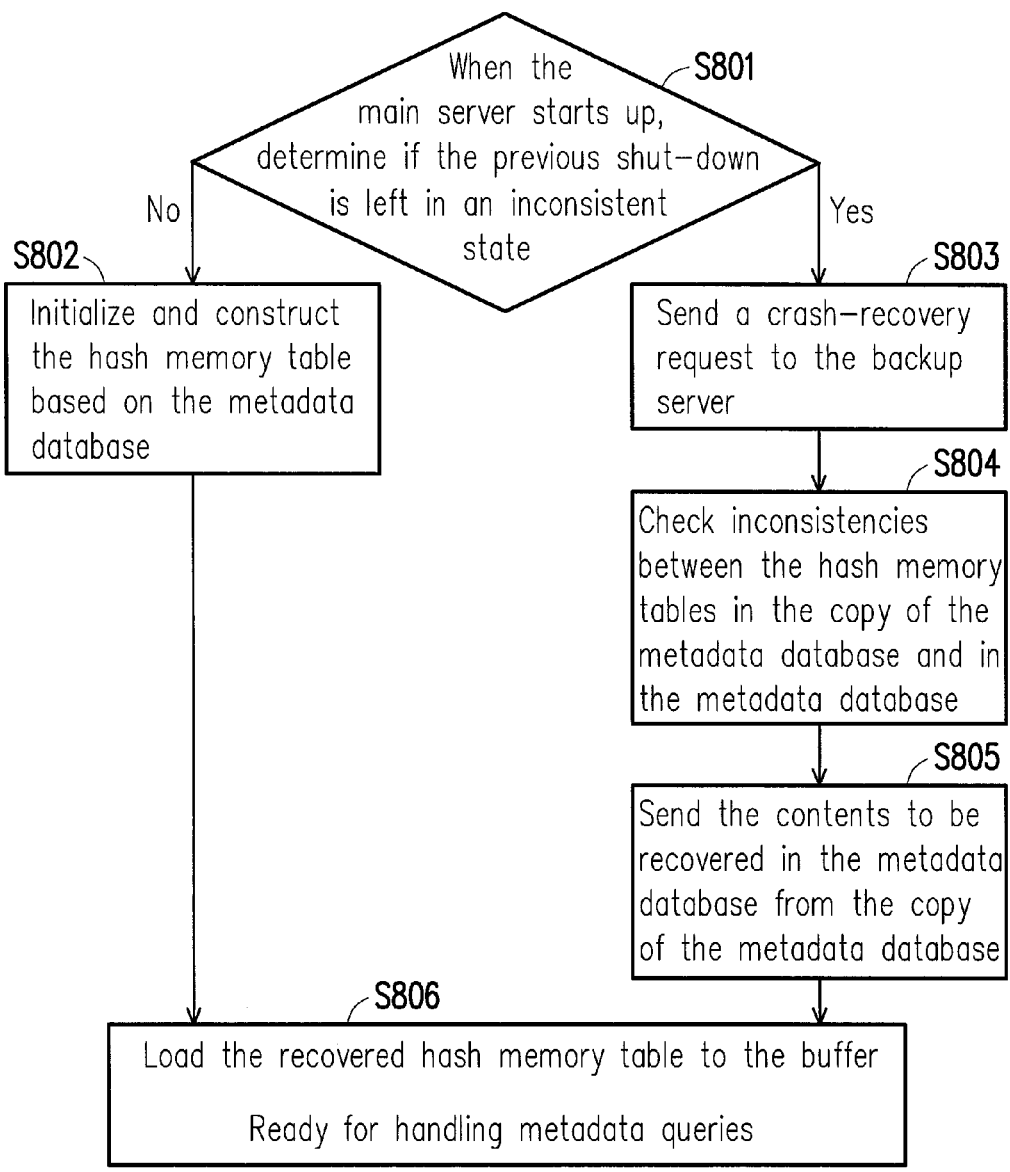
FIG. 8 is a flowchart illustrating a method for recovering the hash memory table when a crash-recovery request is sent to the metadata management unit according to an exemplary embodiment of the present disclosure.

FIG. 8 is a flowchart illustrating a method for recovering a hash memory table when a crash-recovery request is sent to a metadata management unit according to the present exemplary embodiment of the present disclosure.

Referring to FIG. 8 along with the components of FIG. 1 and FIG. 2, after the main server 105 has crashed, a recovery process may be performed on the next start-up. Whenever the main server 105 starts up, it is determined whether the previous shut-down is left in an inconsistent state (Step S801). If main server 105 is left in a consistent state from the previous shut-down, the hash memory table 142 is initialized and constructed based on the metadata database 144 (Step S802). If the main server 105 is left in an inconsistent state from the previous shut-down, (i.e. the main server 105 is shut-down due to a crash), a crash-recovery request is sent to the backup server 150 (Step S803). The backup server checks inconsistencies between the hash memory tables in the copy of the metadata database 152 and in the metadata database 144 (Step S804). Then the contents to be recovered in the metadata database 144 are sent from the copy of the metadata database 152 (Step S805). Lastly, the recovered hash memory table 142 is loaded to the buffer 120 and ready for handling metadata queries (Step S806).

In an exemplary embodiment, the above-mentioned control module of the metadata management unit may be implemented in a software form and stored in a computer-readable recording medium including a CD-ROM, a magnetic tape, a floppy disc, or an optical data storage device.

To sum up, the present disclosure provides a method and a system for metadata facilitated with high efficiency for update and long durability for system usage. Such method and system commits a metadata management in a hashing fashion and drastically improves the physical disk access efficiency such as a file writing request, reading request, relocating request, and deleting request by reducing the number of the disk I/O operation in order to identify a file match or the absence of a file match. Accordingly, efficiency is improved and runtime costs are reduced as compared to conventional database management systems. The present disclosure is suitably applicable to network services such as a cloud storage service with intensive workloads and updates.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for accessing files on a storage system having a buffer and a disk, the method comprising:

building a hash memory table, wherein the hash memory table includes a plurality of hash buckets respectively corresponding to a plurality of index hash codes, each of the hash buckets has a pointer, each of the pointer points towards at least one entry, each of the entries has a physical address field and a hash code field, the physical address fields respectively record physical addresses storing the files, the hash code fields respectively record verification hash codes corresponding to the files, the index hash codes is generated by inputting keys of the files to an index hash function and the verification hash codes is generated by inputting the keys of the files to a verification hash function;

loading the hash memory table into the buffer with a bucket-based replacement policy; and accessing the files according to the hash memory table loaded into the buffer, wherein the step of accessing the files according to the hash memory table loaded into the buffer comprises:

writing a new file into the disk and obtaining a physical address storing the new file from a file memory table loaded into the buffer system of the disk, wherein writing a new file into the disk comprises embedding a logical file name of the new file into the physical address;

inserting a new hash bucket in the hash memory table;

generating an index hash code corresponding to the new hash bucket by inputting a key of the new file into the index hash function;

adding an entry corresponding to the new file in the new hash bucket and setting a pointer of the new hash bucket pointing towards the entry corresponding to the new file;

generating a verification hash code corresponding to the new file by inputting the key of the new file into the verification hash function;

recording physical address storing the new file into the physical address field of the entry corresponding to the new file; and recording the verification hash code corresponding to the new file into the hash code field of the entry corresponding to the new file.

2. The method according to claim 1, wherein said step of accessing the files according to the hash memory table loaded into the buffer comprises:

receiving a command for reading the new file;

generating a first search hash code by inputting the key of the new file into the index hash function;

identifying the new hash bucket form the hash buckets by comparing the first search hash code with the index hash codes;

reading at least one searched entry according to the pointer of the new hash bucket corresponding to the first search hash code;

generating a second search hash code by inputting the key of the new file into the verification hash function;

identifying the entry corresponding to the new file among the at least one searched entry by comparing the second search hash code with at least one verification hash code recorded in at least one hash code field of the at least one searched; and reading content of the new file from the disk according to the physical address recorded in the physical address filed the entry corresponding to the new file.

3. The method according to claim 1, wherein said step of accessing the files according to the hash memory table loaded into the buffer comprises:

receiving a command for reading the new file;

generating a first search hash code by inputting the key of the new file into the index hash function;

identifying the new hash bucket form the hash buckets by comparing the first search hash code with the index hash codes;

reading at least one searched entry according to the pointer of the new hash bucket corresponding to the first search hash code;

generating a second search hash code by inputting the key of the new file into the verification hash function;

identifying the entry corresponding to the new file among the at least one searched entry by comparing the second search hash code with at least one verification hash code recorded in at least one hash code field of the at least one searched and comparing the logical file name of the new file with at least one logical file name embedded into at least one physical address storing at least one files corresponding to at least one searched entry; and reading content of the new file from the disk according to the physical address recorded in the physical address filed the entry corresponding to the new file.

4. The method according to claim 1, wherein said step of accessing the files according to the hash memory table loaded into the buffer comprises:

when the file system of the disk moves the new file from the physical address storing the new file to another physical address, updating the another physical address into the physical address field of the entry corresponding to the new file in the hash memory table.

5. The method according to claim 1, wherein said step of accessing the files according to the hash memory table loaded into the buffer comprises:

when the file system of the disk deletes the new file from the physical address storing the new file to another physical address, deleting the entry corresponding to the new file in the hash memory table.

6. The method according to claim 1, further comprising:
building a metadata database; and
storing information recorded in the hash memory table into the metadata database.

7. The method according to claim 6, further comprising:
backuping a copy of the metadata database into a backup server; and
recovering the hash memory table based on the copy of the metadata database stored in the backup server.

8. A storage system, comprising:
a microprocessor;
a buffer, coupled to the microprocessor;
a disk, coupled to the microprocessor;
a metadata management unit, coupled to the microprocessor and configured to build a hash memory table, wherein the hash memory table includes a plurality of hash buckets respectively corresponding to a plurality of index hash codes, each of the hash buckets has a pointer, each of the pointer points towards at least one entry, each of the entries has a physical address field and a hash code field, the physical address fields respectively record physical addresses storing files, the hash code fields respectively record verification hash codes corresponding to the files, the index hash codes is generated by inputting keys of the files to an index hash function and the verification hash codes is generated by inputting the keys of the files to a verification hash function, the metadata management unit is configured to load the hash memory table into the buffer with a bucket-based replacement policy and access the files according to the hash memory table loaded into the buffer, and the metadata management unit writes a new file into the disk and obtains a physical address storing the new file from a file system of the disk, wherein the metadata management unit generates an index hash code corresponding to a new hash bucket by inputting a key of the new file into the index hash function and generates a verification hash code corresponding to the new file by inputting the key of the new file into the verification hash function, wherein writing the new file into disk includes embedding a logical file name of the new file into the physical address, wherein the metadata management unit inserts a new hash bucket in the hash memory table, adds an entry corresponding to the new file in the new hash bucket and sets a pointer of the new hash bucket pointing towards the entry corresponding to the new file, wherein the metadata management unit records the physical address storing the new file into a physical address field of the entry corresponding to the new file and records the verification hash code corresponding to the new file into the hash code field of the entry corresponding to the new file.

9. The storage system according to claim 8, wherein the metadata management unit is further configured to receive a command for reading the new file, generate a first search hash code by inputting the key of the new file into the index hash function, identify the new hash bucket form the hash buckets by comparing the first search hash code with the index hash codes; read at least one searched entry according to the pointer of the new hash bucket corresponding to the first search hash code; and generate a second search hash code by inputting the key of the new file into the verification hash function, wherein the metadata management unit is further configured to identify the entry corresponding to the new file among the at least one searched entry by comparing the second search hash code with at least one verification hash code recorded in at least one hash code field of the at least one searched, and read content of the new file from the disk according to the physical address recorded in the physical address filed the entry corresponding to the new file.

10. The storage system according to claim 8, wherein the metadata management unit is further configured to receive a command for reading the new file, generate a first search hash code by inputting the key of the new file into the index hash function, identify the new hash bucket form the hash buckets by comparing the first search hash code with the index hash codes; read at least one searched entry according to the pointer of the new hash bucket corresponding to the first search hash code; and generate a second search hash code by inputting the key of the new file into the verification hash function, wherein the metadata management unit is further configured to identify the entry corresponding to the new file among the at least one searched entry by comparing the second search hash code with at least one verification hash code recorded in at least one hash code field of the at least one searched and comparing the logical file name of the new file with at least one logical file name embedded into at least one physical address storing at least one files corresponding to at least one searched entry, and read content of the new file from the disk according to the physical address recorded in the physical address filed the entry corresponding to the new file.

11. The storage system according to claim 8, wherein when the file system of the disk moves the new file from the physical address storing the new file to another physical address, the metadata management unit is further configured to update the another physical address into the physical address field of the entry corresponding to the new file in the hash memory table.

12. The storage system according to claim 8, wherein when the file system of the disk deletes the new file from the physical address storing the new file to another physical address, the metadata management unit is further configured to delete the entry corresponding to the new file in the hash memory table.

13. The storage system according to claim 8, wherein the metadata management unit is further configured to a metadata database and store information recorded in the hash memory table into the metadata database.

14. The storage system according to claim 13, further comprising:

a backup server, wherein the metadata management unit is further configured to backup a copy of the metadata database into the backup server, wherein the metadata management unit is further configured to recover the hash memory table based on the copy of the metadata database stored in the backup server.

* * * * *